US012698720B2

(12) United States Patent
Clements et al.

(10) Patent No.: US 12,698,720 B2
(45) **Date of Patent: *Aug. 4, 2026**

(54) HIGH TEMPERATURE GAS TURBINE ENGINE

(71) Applicant: General Electric Company, Schenectady, NY (US)

(72) Inventors: Jeffrey Donald Clements, Mason, OH (US); Mark Willard Marusko, Springboro, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/036,185

(22) Filed: Jan. 24, 2025

(65) Prior Publication Data

US 2025/0163816 A1 May 22, 2025

Related U.S. Application Data

(63) Continuation of application No. 18/343,069, filed on Jun. 28, 2023.

(51) Int. Cl.
*F01D 9/04* (2006.01)
*F01D 25/12* (2006.01)

(52) U.S. Cl.
CPC ............... *F01D 9/04* (2013.01); *F01D 25/12* (2013.01); *F05D 2220/323* (2013.01); *F05D 2240/12* (2013.01); *F05D 2260/20* (2013.01)

(58) Field of Classification Search
CPC .... F01D 5/08–5/088; F01D 9/02; F01D 9/04; F01D 9/041; F01D 25/08; F01D 25/10; F05D 2240/12; F05D 2260/20; F05D 2300/5021
See application file for complete search history.

(56) References Cited

U.S. PATENT DOCUMENTS

| | | | |
|---|---|---|---|
| 4,907,946 | A | 3/1990 | Ciokajlo et al. |
| 7,798,775 | B2 | 9/2010 | Kammel et al. |
| 8,092,163 | B2 | 1/2012 | Shapiro et al. |
| 9,546,557 | B2 | 1/2017 | Grooms, III et al. |
| 10,309,240 | B2 | 6/2019 | Heitman et al. |

(Continued)

*Primary Examiner* — Sang K Kim

(74) *Attorney, Agent, or Firm* — Dority & Manning, P.A.

(57) ABSTRACT

A gas turbine engine is provided, including: a turbomachine comprising a compressor section, a combustion section, and a turbine section in serial flow order, the turbine section comprising a turbine case and a turbine stage, the turbine stage comprising a plurality of turbine stator vanes, the stage being a stage count number, N, downstream from the combustion section, the turbine stator vanes comprising a first vane assembly comprising a nozzle formed of a first material defining a first coefficient of thermal expansion; and a hanger positioned outward of the nozzle along a radial direction and coupling the nozzle to the turbine case, the hanger formed of a second material defining a second coefficient of thermal expansion, the gas turbine engine defining a nozzle efficiency offset, NEO, greater than 1 and less than or equal to 5, wherein NEO is expressed as:

$$NEO = CTER \times \left(1 - \frac{W_N}{W_{25}}\right) \Big/ N^{0.15}.$$

20 Claims, 7 Drawing Sheets

(56) References Cited

U.S. PATENT DOCUMENTS

| | | | | |
|---|---|---|---|---|
| 10,711,629 | B2 | 7/2020 | van der Merwe et al. | |
| 10,961,857 | B2 | 3/2021 | Whittle et al. | |
| 10,982,564 | B2 | 4/2021 | Weaver et al. | |
| 11,041,392 | B2 | 6/2021 | Carr et al. | |
| 11,174,742 | B2 | 11/2021 | Whittle et al. | |
| 2002/0127097 | A1* | 9/2002 | Darolia | F01D 9/042<br>415/137 |
| 2009/0003993 | A1* | 1/2009 | Prill | F01D 5/284<br>415/208.1 |
| 2012/0128482 | A1 | 5/2012 | Dezouche et al. | |
| 2016/0169033 | A1 | 6/2016 | Weaver et al. | |

* cited by examiner

| CTER | $W_{10}/W_{25}$ | N | NEO |
|---|---|---|---|
| 2 | 0.2 | 1 | 1.600 |
| 2 | 0.15 | 1 | 1.700 |
| 2 | 0.1 | 1 | 1.800 |
| 2 | 0.05 | 2 | 1.712 |
| 2 | 0.025 | 2 | 1.757 |
| 2 | 0.01 | 2 | 1.784 |
| 2 | 0.02 | 8 | 1.435 |
| 2 | 0.01 | 8 | 1.449 |
| 2 | 0.005 | 8 | 1.457 |
| 4 | 0.15 | 1 | 3.400 |
| 4 | 0.1 | 1 | 3.600 |
| 4 | 0.05 | 1 | 3.800 |
| 4 | 0.025 | 2 | 3.515 |
| 4 | 0.01 | 2 | 3.569 |
| 4 | 0.005 | 2 | 3.587 |
| 4 | 0.01 | 2 | 2.899 |
| 4 | 0.005 | 8 | 2.914 |
| 4 | 0 | 8 | 2.928 |
| 5 | 0.15 | 1 | 4.250 |
| 5 | 0.1 | 1 | 4.500 |
| 5 | 0.05 | 1 | 4.750 |
| 5 | 0.025 | 2 | 4.394 |
| 5 | 0.01 | 2 | 4.461 |
| 5 | 0.005 | 2 | 4.484 |
| 5 | 0.01 | 8 | 4.624 |
| 5 | 0.005 | 8 | 3.642 |
| 5 | 0 | 8 | 3.660 |

FIG. 6

HIGH TEMPERATURE GAS TURBINE ENGINE

CROSS-REFERENCE TO RELATED APPLICATIONS

This application is a continuation application of U.S. application Ser. No. 18/343,069 filed Jun. 28, 2023, which is hereby incorporated by reference in its entirety.

FIELD

The present disclosure relates to a gas turbine engine designed to operate at elevated exhaust gas temperatures.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

The turbomachine may include a low pressure compressor, a high pressure compressor, a combustor, a high pressure turbine, and a low pressure turbine in serial flow relationship. The high pressure turbine and low pressure turbine each includes annular arrays ("rows") of stationary vanes or nozzles that direct the gases exiting the combustor or corresponding upstream rows of rotating blades into corresponding downstream rows of rotating blades. Collectively one row of nozzles and one row of blades make up a "stage". These components operate in a high temperature environment.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 6 is a chart of gas turbine engines in accordance with an exemplary embodiment of the present disclosure.

DETAILED DESCRIPTION

Figure 1:
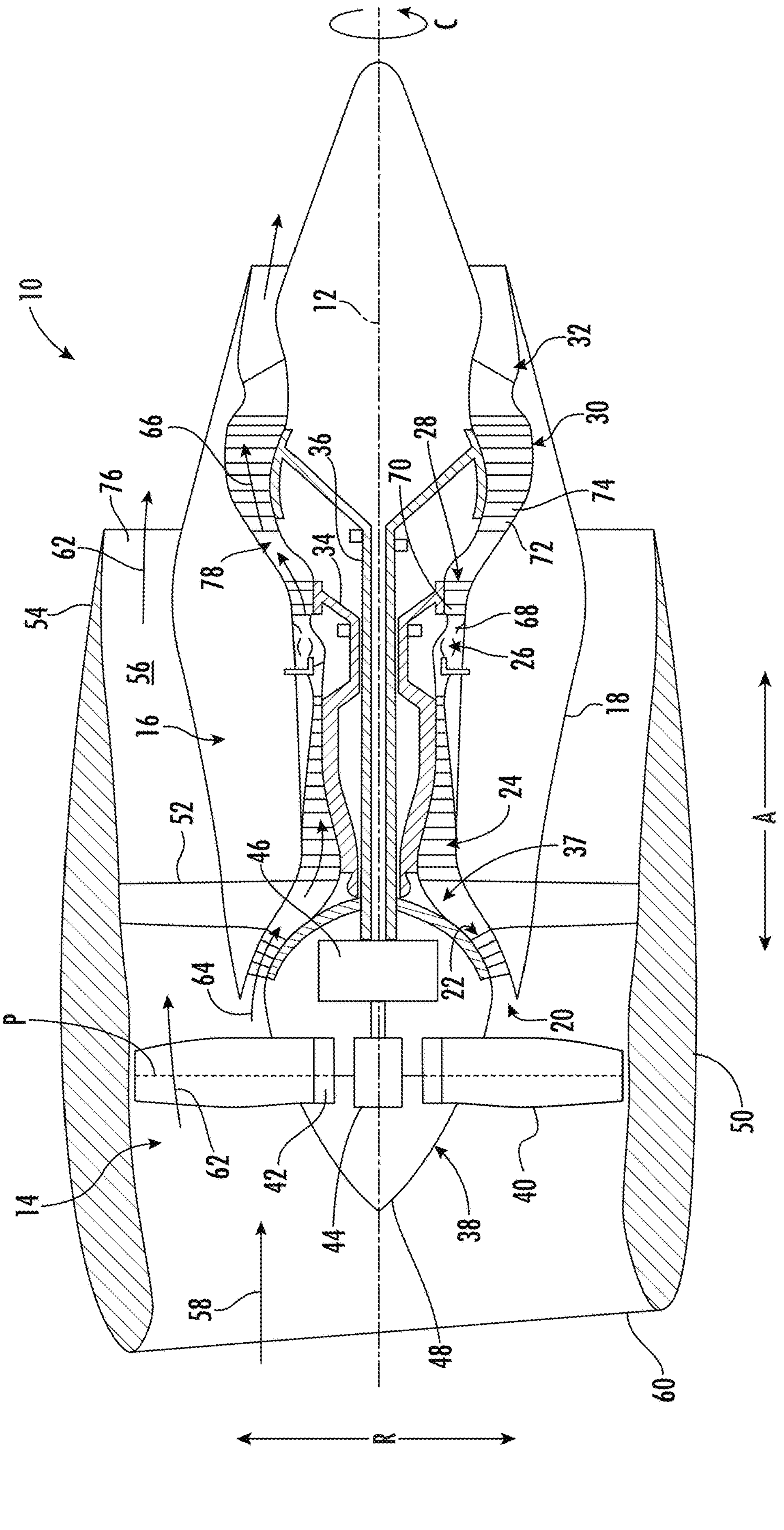
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "cooled cooling air system" is used herein to mean a system configured to provide a cooling airflow to one or more components exposed to a working gas flowpath of a turbomachine of a gas turbine engine at a location downstream of a combustor of the turbomachine and upstream of an exhaust nozzle of the turbomachine, the cooling airflow being in thermal communication with a heat exchanger for reducing a temperature of the cooling airflow at a location upstream of the one or more components.

Figure 2:
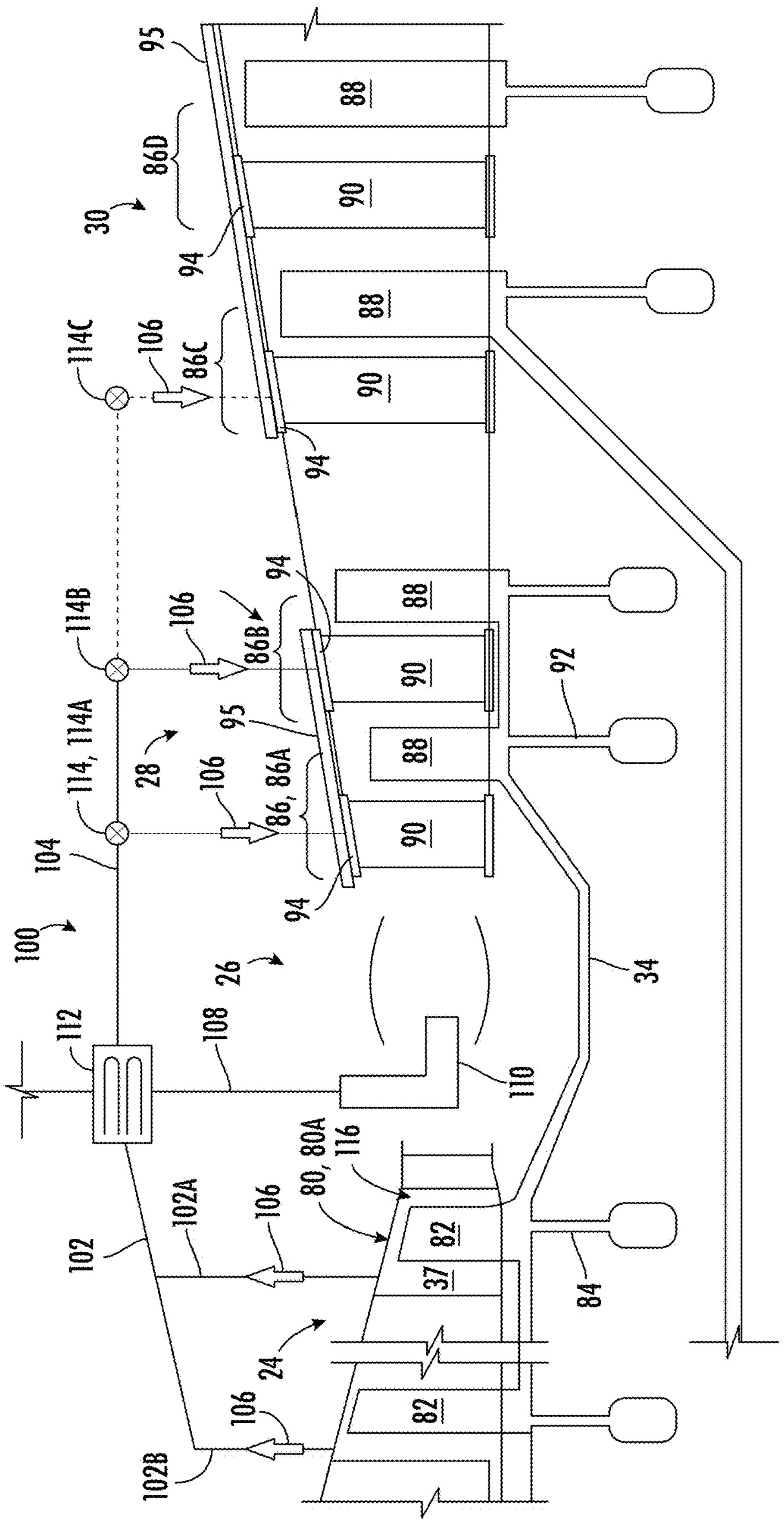
FIG. 2 is a schematic, cross-sectional view of a portion of the turbomachine of the exemplary gas turbine engine of FIG. 1.

The cooled cooling air systems contemplated by the present disclosure may include a thermal bus cooled cooling air system or a dedicated heat exchanger cooled cooling air system (i.e., a cooled cooling air system including a heat sink heat exchanger dedicated to the cooled cooling air system; see FIG. 2); a bypass heat exchanger cooled cooling air system having a heat sink heat exchanger thermally coupled to an airflow through a bypass passage; an air-to-air cooled cooling air system (i.e., a cooled cooling air system having a heat sink heat exchanger configured to transfer heat to an airflow); an oil-to-air cooled cooling air system (i.e., a cooled cooling air system having a heat sink heat exchanger configured to transfer heat to an oil flow); a fuel-to-air cooled cooling air system (i.e., a cooled cooling air system having a heat sink heat exchanger configured to transfer heat to a fuel flow, such as a Jet A fuel flow, a liquid hydrogen or hydrogen gas fuel flow, etc.; see, e.g., FIG. 2); or a combination thereof.

In one or more of the exemplary cooled cooling air systems described herein, the cooled cooling air system may receive the cooling air from a downstream end of a high pressure compressor (i.e., a location closer to a last stage of the high pressure compressor than a first stage of the high pressure compressor), an upstream end of the high pressure compressor (i.e., a location closer to a first stage of the high pressure compressor than to a last stage of the high pressure compressor), a downstream end of a low pressure compressor (i.e., a location closer to a last stage of the low pressure compressor), an upstream end of the low pressure compressor (i.e., a location closer to a first stage of the low pressure compressor), a location between compressors, a bypass passage, a combination thereof, or any other suitable airflow source.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The phrases "from X to Y" and "between X and Y" each refers to a range of values inclusive of the endpoints (i.e., refers to a range of values that includes both X and Y).

The term "redline exhaust gas temperature" refers to a maximum rated exhaust gas temperature for a gas turbine engine.

The term "hanger" as used herein is a load bearing structural member that connects one or more stator vanes to an engine casing of a gas turbine engine. The hanger is positioned at an outer end(s) of the one or more stator vanes along a radial direction of the gas turbine engine (see FIG. 1, radial direction R). Hangers can be used in association with stator vanes in a high pressure turbine of the gas turbine engine, a low pressure turbine of the gas turbine engine, and/or other sections of the gas turbine engine.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3\ Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials are particularly suitable for higher temperature applications. Additionally, these ceramic materials are lightweight compared to superalloys, yet can still provide strength and durability to the component made therefrom.

Generally, a gas turbine engine, such as a turbofan gas turbine engine, includes a fan and a turbomachine, with the turbomachine rotating the fan to generate thrust. The turbomachine includes a compressor section, a combustion section, a turbine section, and an exhaust section and defines a working gas flowpath therethrough. Conventionally, gas turbine engine design practice has limited a compressor pressure ratio based at least in part on the gas temperatures at the exit stage of a high pressure compressor. The higher gas temperatures at the exit stage of the high pressure compressor may lead to prohibitively high temperatures through the turbine section once heat from the combustion process within the combustion section is added to the flow.

In order to realize new levels of propulsive efficiencies, the inventors set out to design a gas turbine engine with a redline exhaust gas temperature of at least 1,100 degrees Celsius. In the process of designing a gas turbine engine with a redline exhaust gas temperature of at least 1,100 degrees Celsius, the inventors recognized that inclusion of various stages of turbine stator vanes formed of an advanced, high temperature material capable of withstanding elevated temperatures provides significant benefits and that the associated challenges of integrating this advanced, high temperature material with other turbine structure could be overcome. Further, the inventors recognized that providing cooling air to these various stages of turbine stator vanes may further provide significant benefits to such a gas turbine engine. Specifically, these benefits may be in the form of allowing the gas turbine engine to operate at the desired higher temperatures.

However, with respect to using cooling air to maintain turbine components below certain temperature thresholds as the temperatures within the working gas flowpath are increased requires bleeding off even more cooling air from the compressor section than previously calculated, which means even more of the work used to compress such air is not driving the turbine. Instead, this bled-off air is diverted away from the core flowpath and used to cool the turbine section.

Further, while high temperature, advanced materials are able to withstand elevated temperatures with less or no cooling, they generally possess material properties that limit their ability to withstand forces in certain directions, for example, in a tensile direction or directions in which a tensile component is present, such as, but not limited to twisting or bending directions. When integrating components formed of these high temperature material, such as when mounting the high temperature material to an engine case using a support structure (referred to herein as a "hanger"), a load path is needed between materials having mismatched coefficients of thermal expansion, as in the case of a turbine stator vane formed of a Ceramic Matrix Composite (CMC) material and a hanger formed at least in part from a metal or metal alloy.

Others have concluded that if high temperature materials were used in the turbine to achieve an elevated operating temperature, the material thermal expansion coefficient mismatch would result in joints (i.e., the location where the two material are joined together) that could not be kept sufficiently airtight to realize the higher efficiencies at elevated operating temperatures. Accordingly, despite the reduction in the amount of cooling required for the components formed of these high temperature materials and capability to operate at higher temperatures, it was believed that existing engines, which operate at lower operating temperatures and require more cooling air would indeed realize higher efficiencies because there would be significantly less leakage from the working gas flow path. Moreover, the proposed use of high temperature material was disfavored because it was believed that the joints would be susceptible to increased wear and premature failure resulting from the substantial, temperature-induced relevant movement between the components during each operating cycle of the gas turbine engine. It was concluded, therefore, that despite the potential efficiency benefits of a gas turbine engine operating with a redline exhaust gas temperature of at least 1,100 degrees Celsius and using an advanced, high temperature material in the turbine, the result would be instead a net loss in propulsive efficiency.

The inventors however found that higher engine efficiencies were indeed attainable when operating at elevated temperatures using advanced material. The inventors discovered that a combination of advanced, high temperature material for a turbine stage and a certain level of cooling airflow supplied to the turbine stage, in conjunction with an elevated redline exhaust gas temperature and overall thrust output, produced a desirable result. This combination may be tailored based on the location of low-pressure or power turbine stator vanes relative to the combustion section, such as a first stage, second stage location relative to the combustion section.

In particular, the inventors discovered, unexpectedly, in the course of designing a gas turbine engine with a redline exhaust gas temperature of at least 1,100 degrees Celsius, that the costs associated with inclusion of turbine stator vanes formed of advanced, high temperature materials (and optionally cooled in the manner described above) may be overcome to achieve a net propulsive efficiency gain, contrary to previous thinking and expectations. In particular, the inventors discovered during the course of designing several gas turbine engines of varying thrust classes and propulsive efficiency requirements (including the configurations illustrated and described in detail herein), a relationship exists among the coefficient of thermal expansion mismatch between the turbine stator vanes and respective hangers, an amount of cooling flow provided to the turbine stator vanes, and a stage count of the turbine stator vanes, whereby operating the gas turbine engine with a redline exhaust gas temperature of at least 1,100 degrees Celsius in accordance with one or more of the exemplary aspects described herein may result in a net propulsive gain to the overall engine design. As noted, previous thinking was that the inefficiencies introduced by having turbine stator vanes formed of a different material than the hanger used to mount the turbine stator vanes along with a cooling flow to the turbine stator vanes for a gas turbine engine with a redline exhaust gas temperature of at least 1,100 degrees Celsius would exceed the potential propulsive efficiency benefits.

With a goal of arriving at an improved gas turbine engine capable of providing a net propulsive efficiency benefit with an elevated redline exhaust gas temperatures, the inventors proceeded in the manner of designing gas turbine engines having turbine stator vanes as described herein with various coefficients of thermal expansion mismatch between the turbine stator vanes and respective hangers, various cooling flow provided to the turbine stator vanes, and various stage counts of the turbine stator vanes; checking an operability and net propulsive efficiency benefit of the designed gas turbine engines; redesigning the gas turbine engines to vary the noted parameters based on the impact on other aspects of the gas turbine engines; rechecking the operability and net propulsive efficiency benefit characteristics of the redesigned gas turbine engines; etc. during the design of several different types of gas turbine engines, including the gas turbine engines described herein, which are described below in greater detail.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by a rotatable front hub 48 of the fan section 14 (sometimes also referred to as a "spinner"). The front hub 48 is aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via one or more stages of HP turbine stator vanes 90 that are coupled to the outer casing 18 and HP turbine rotor blades 88 that are coupled to the HP shaft 34, thus causing the HP shaft 34 to rotate, thereby supporting operation of the HP compressor 24. The HP turbine 28 may include a single stage of HP turbine stator vanes 90 and HP turbine rotor blades 88. Alternatively, the HP turbine 28 may include two stages of HP turbine stator vanes 90 and HP turbine rotor blades 88 (i.e., a first stage and a second stage). It will be appreciated that as used herein, the term "stage" refers to a set of stator vanes and rotor blades.

The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the power gear box 46) and a variable pitch gas turbine engine (i.e., including a fan 38 configured as a variable pitch fan), in other embodiments, the gas turbine engine 10 may alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both.

Referring now to FIG. 2, a schematic, cross-sectional view is provided of a portion of the turbomachine 16 of the exemplary gas turbine engine 10 of FIG. 1.

As noted above, during operation of the gas turbine engine 10, an airflow through the working gas flowpath 37 of the gas turbine engine 10 is sequentially compressed as it flows through the compressor section, or more specifically, as it flows through the LP compressor 22 (see FIG. 1) and the HP compressor 24. The compressed air from the compressor section is then provided to the combustion section 26, wherein at least a portion of the compressed air is mixed with fuel and burned to create the combustion gases 66. The combustion gases 66 flow from the combustion section 26 to the turbine section, and more specifically, sequentially through the HP turbine 28 and the LP turbine 30, for the embodiment depicted, driving the HP turbine 28 and the LP turbine 30 (see FIG. 1). The HP shaft 34 is drivingly coupled to both the HP turbine 28 and the HP compressor 24.

Referring particularly to FIG. 2, the HP compressor 24 includes a plurality of compressor stages 80, with each compressor stage 80 including, e.g., a plurality of HP compressor rotor blades 82 and a rotor 84. Each of the various compressor stages 80 is drivingly coupled to the HP shaft 34, such that the HP turbine 28 may drive the HP compressor 24 through the HP shaft 34. Amongst the plurality of compressor stages 80 of HP compressor 24, is an aft-most compressor stage 80A located at an aft end of the HP compressor 24. The compressor rotor blades 82 of the aft-most compressor stage 80A are attached to the respective rotor 84 of the aft-most compressor stage 80A.

The HP turbine 28 and LP turbine 30 similarly include a plurality of turbine stages 86, with each turbine stage 86 including, e.g., a plurality of turbine rotor blades 88, a plurality of turbine stator vanes 90, and a rotor 92. Amongst the plurality of turbine stages 86 is a first turbine stage 86A, located at a forward/upstream-most end of the HP turbine 28 and a second turbine stage 86B. The first and second turbine stages 86A, 86B are a first and second stage of the HP turbine 28. The plurality of turbine stages 86 further includes a third turbine stage 86C and a fourth turbine stage 86D. The first through fourth turbine stages 86A-86D are arranged sequentially. The third and fourth turbine stages 86C, 86D are part of the LP turbine 30. In such a manner, it will be appreciated that each set of the plurality of turbine rotor blades 88 and turbine stator vanes 90 defines a stage number count number, N, and is the stage count number, N, downstream from the combustion section 26 (i.e., first turbine stage 86A defines a stage count number, N, equal to 1, and the fourth turbine stage 86D defines a stage count number, N, equal to 4).

Briefly, it will be appreciated that each of the plurality of turbine stator vanes 90 is mounted at a radially outer end along the radial direction R with a structural member 94, which is referred to herein as a hanger. The structural member 94 may, in turn, be coupled to a turbine case 95 of the engine 10. It will be appreciated that as used herein, the term "case" refers generally to a support structure in the engine for, e.g., turbine stator vanes (such as a turbine case, a turbine frame, etc.).

As noted above, the gas turbine engine 10 may be designed with an elevated redline exhaust gas temperature, e.g., of at least 1,100 degrees Celsius. In order to accommodate the elevated temperatures, the turbine stator vanes 90, and in particular the turbine stator vanes 90 of at least the first, second, and third turbine stages 86A, 86B, 86C, are formed of an advanced, high temperature material. For example, the turbine stator vanes 90 of at least the first, second, and third turbine stages 86A, 86B, 86C may be formed of a ceramic matrix composite (CMC) material.

Further, for the embodiment depicted, the gas turbine engine 10 includes a cooling system 100. The cooling system 100 generally includes an inlet duct 102 configured to receive a cooling airflow 106 and a distribution duct 104 (or network of distribution ducts) for providing the cooling airflow 106 to one or more components of the turbomachine 16.

Specifically, for the embodiment depicted, the inlet duct 102 is in airflow communication with the HP compressor 24 for receiving a bleed airflow from the HP compressor 24 as the cooling airflow 106. In particular, for the embodiment depicted, the inlet duct 102 includes a first inlet duct 102A in airflow communication with the HP compressor 24 at a first location and a second inlet duct 102B in airflow communication with the HP compressor 24 at a second location (upstream of the first location). In such a manner, the first and second inlet ducts 102A, 102B may be configured to extract air from the HP compressor 24 at different pressures and temperatures.

It will be appreciated that although the inlet duct 102 is depicted with two sections, in other exemplary embodiments, the inlet duct 102 may include any other suitable number of sections to extract additional or alternative flows of air from the HP compressor 24, from the LP compressor 22, or both.

Further, for the embodiment depicted, the turbomachine 16 includes a fuel line 108 extending to a fuel nozzle 110 of the combustion section 26. The cooling system 100 includes a heat exchanger 112 to thermally couple the cooling airflow 106 through the inlet duct 102 to a fuel flow through the fuel line 108. In such a manner, the cooling system 100 may cool the cooling airflow 106 prior to providing the cooling airflow 106 to the turbine stages 86. In such a manner, the cooling system 100 may be referred to as a cooled cooling air (CCA) system.

Notably, in other exemplary embodiments, the cooling system 100 may not include the heat exchanger 112, or any other similar heat exchangers, such that the cooling system 100 does not provided cooled cooling airflow therethrough.

The distribution duct 104 extends to, and provides the cooling airflow 106 to, the turbine stator vanes 90 of the first turbine stage 86A, the turbine stator vanes 90 of the second turbine stage 86B, and optionally to the turbine stator vanes 90 of the third turbine stage 86C.

Briefly, the cooling system 100 further includes valves 114 to control a mass flowrate, $W_N$, of the cooling airflow 106 provided to a given stage of turbine stator vanes 90. In particular, the cooling system 100 includes a first valve 114A to control a mass flowrate, $W_{N1}$, of the cooling airflow 106 provided to the turbine stator vanes 90 of the first turbine stage 86A; a second valve 114B to control a mass flowrate, $W_{N2}$, of the cooling airflow 106 provided to the turbine stator vanes 90 of the second turbine stage 86B; and optionally a third valve 114C to control a mass flowrate, $W_{N3}$, of the cooling airflow 106 provided to the turbine stator vanes 90 of the third turbine stage 86C.

As will further be appreciated, the mass flowrate, $W_N$, of the cooling airflow 106 provided to a given stage of turbine stator vanes 90 may be referenced as a percentage of a mass flowrate, $W_{25}$, of an airflow through the working gas flowpath 37 at an inlet of the HP compressor 24. The ratio, $W_N$ divided by $W_{25}$, can indicate how much cooling airflow is provided to the given stage of turbine stator vanes 90.

It will be appreciated that although the cooling system 100 includes the inlet duct 102 in a configuration that converges down to single flow before providing the cooling airflow 106 to the distribution duct 104, in other exemplary embodiments, the cooling system 100 may include a plurality of dedicated networks of cooling airflow 106 such that, e.g., cooling airflow 106 from the first inlet duct 102A is provided to a location in the turbine section without mixing with cooling airflow 106 from the second inlet duct 102B.

Figure 3:
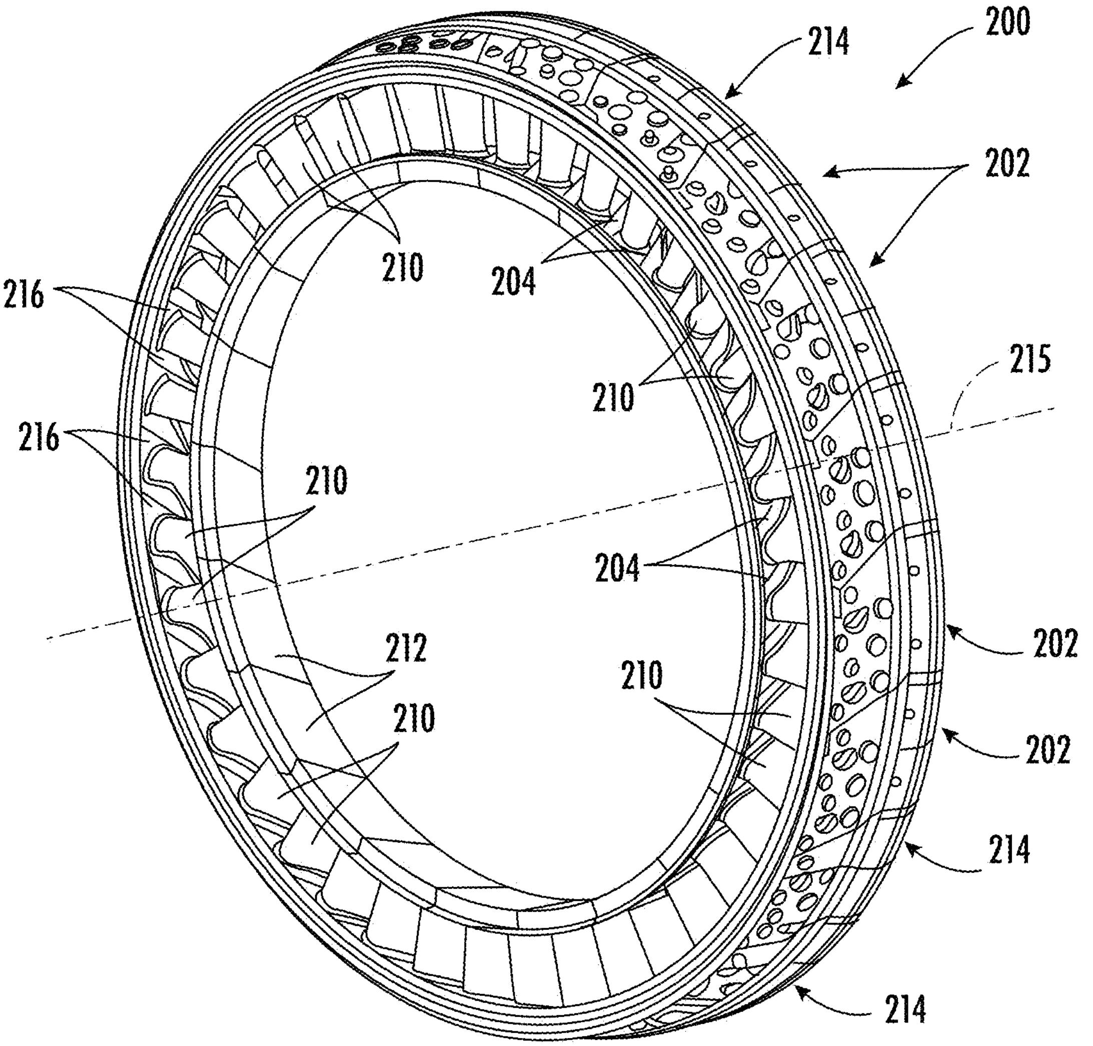
FIG. 3 is a perspective view of a turbine stator vane assembly in accordance with an example embodiment of the present disclosure.

Referring now to FIG. 3, FIG. 3 is a perspective view of a stator vane assembly 200 in accordance with an example embodiment of the present disclosure. In the example embodiment, stator vane assembly 200 may be located within HP turbine 28 and/or LP turbine 30 (e.g., as one or more of the stages of turbine stator vanes 90 described above with reference to FIG. 2). Stator vane assembly 200 is formed of one or more stator vane segment assemblies 202. Stator vane segment assemblies 202 direct combustion gases downstream through a subsequent row of rotor blades (not shown). The stator vane assembly 200 and the plurality of stator vane segment assemblies 202 defining stator vane assembly 200 facilitate extracting energy by the immediately downstream rotor blades (shown in FIG. 2; e.g., turbine stator vanes 90 and downstream turbine rotor blades 88).

The stator vane segment assemblies 202 include an inner band 204 and an outer band 216 and a plurality of struts 208 (not shown in FIG. 3), each strut extending through one of a plurality nozzle airfoils 210 (or simply "nozzles"). The inner band 204 and outer band 216 extend circumferentially 360 degrees about a longitudinal centerline 215.

The stator vane assembly 200 is formed of the plurality of stator vane segment assemblies 202 each of which includes an inner support structure 212, at least one nozzle airfoil 210, and a hanger 214. The hanger 214 is a load bearing structural member that connects one or more stator vanes (the at least one nozzle airfoil 210 in FIG. 3) to an engine casing of a gas turbine engine (not shown). The hanger 214 is positioned at an outer end(s) of the one or more stator vanes along a radial direction R. The hanger 214 is depicted separate from the outer band 216, but in other embodiments, the outer band 216 may be formed with the hanger 214. Further, it will be appreciated that the hanger 214 may be directly couple to the at least one nozzle airfoil 210, or in alternative embodiments may be coupled to the at least one nozzle airfoil 210 through one or more intermediate components, such as the outer band 216 for embodiments where the outer band 216 is separate from the hanger 214.

Figure 4:
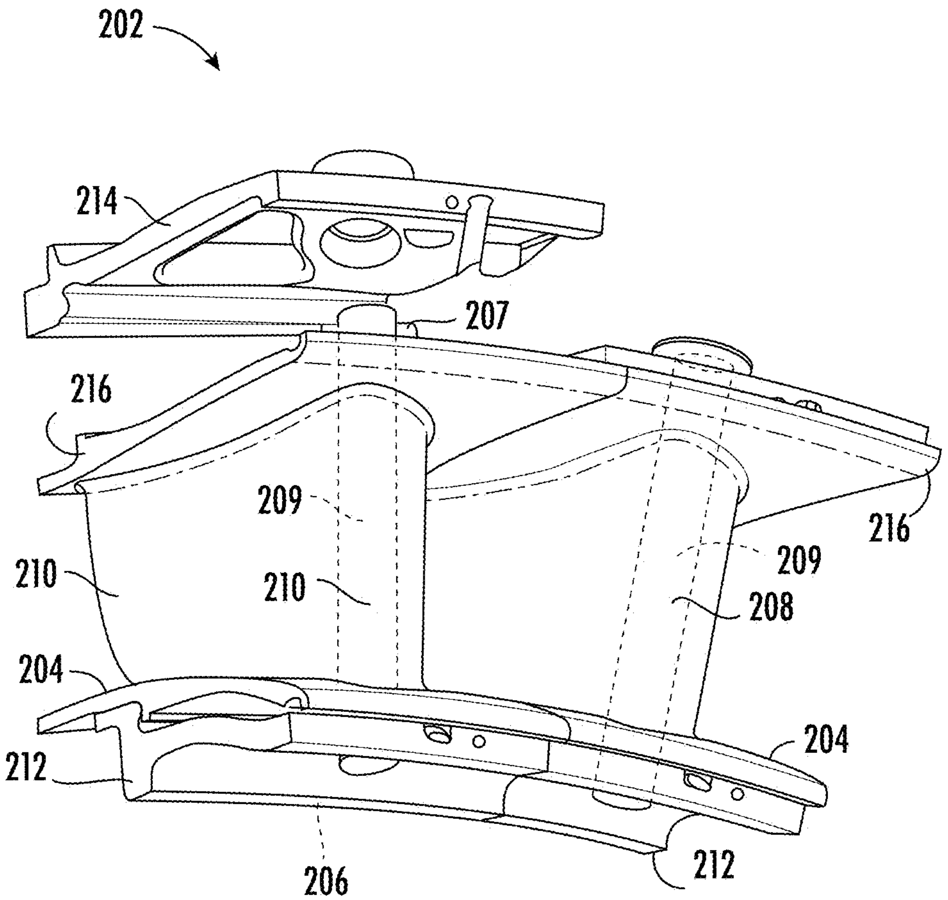
FIG. 4 is a partially exploded view of a nozzle segment assembly in accordance with an example embodiment of the present disclosure from a forward perspective looking aft.
Figure 5:
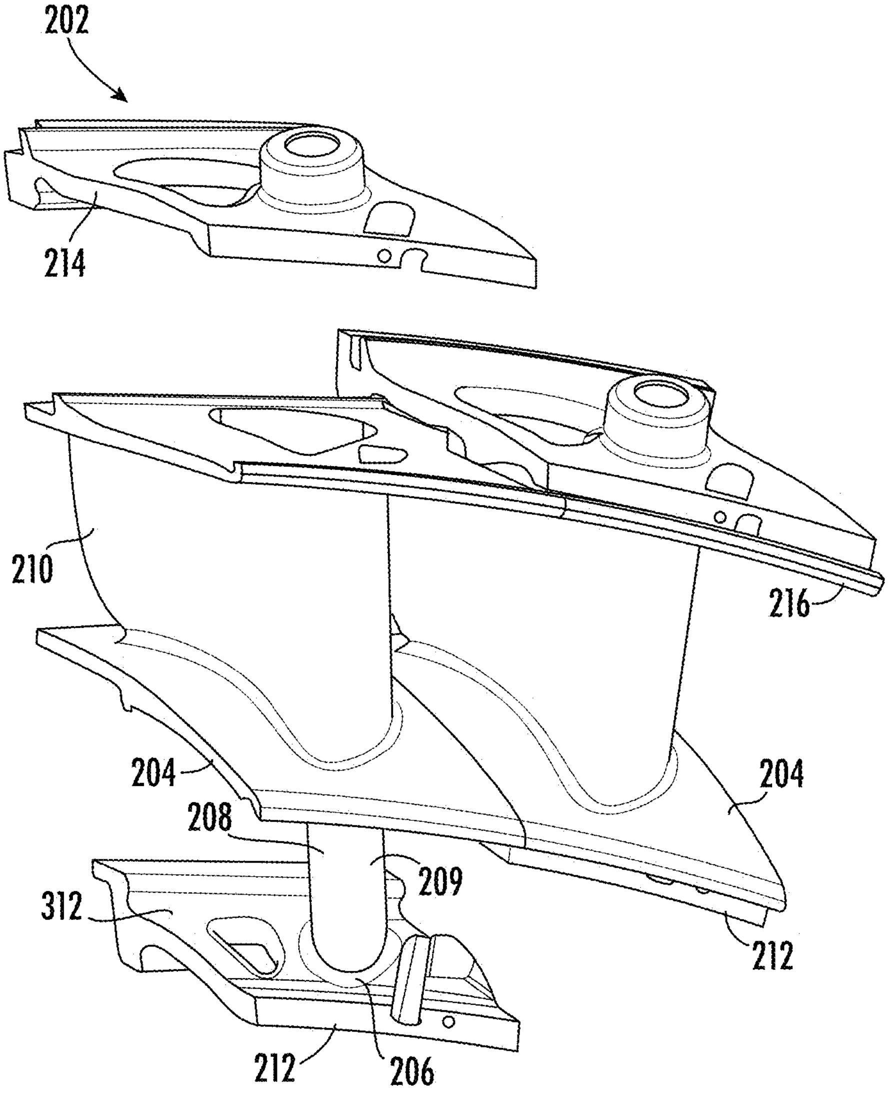
FIG. 5 is another partially exploded view of a nozzle segment assembly also from a forward perspective looking aft.

Referring now to FIGS. 4 and 5, FIG. 4 is a partially exploded view, forward looking aft perspective, of stator vane segment assemblies 202 in accordance with an example embodiment. FIG. 5 is another partially exploded view of stator vane segment assemblies 202 also from a forward perspective looking aft.

The strut 208 carries a load from the radially inward side of the stator vane segment assembly 202 at inner support structure 212 to the radially outward side at the hanger 214 where load is transferred to a structure of the engine, such as, but not limited to an engine casing, and mechanically supports nozzle airfoil 210. The strut 208 may be connected to inner support structure 212 and the hanger 214 by, for example, bolting, fastening, capturing, combinations thereof, and being integrally formed with one or both 212 and 214.

In the example embodiment, stator vane segment assembly 202 includes the inner support structure 212 formed of a first metallic material and the hanger 214 formed of a second metallic material (which may be the same as the first metallic material in certain embodiments). The strut 208 is connected to inner support structure 212 or formed integrally with inner support structure 212. Struts 208 may be hollow and may each have at least one thickened internal wall sufficient to provide the desired stiffness and strength. Strut 208 includes a first mating end 206 (hidden by inner support structure 212 in FIG. 3), a second opposing mating end 207, and a strut body 209 extending radially therebetween. In the example embodiment, strut body 209 is cylindrically-shaped. In various embodiments, strut body 209 has non-circular cross-section, for example, but, not limited to, oval, oblong, polygonal, or combinations thereof. In the example embodiment, the first and second metallic material are made from the same material. The inventors found that suitable materials include a nickel-based superalloy, an intermetallic material such as gamma titanium aluminide, or other alloy that exhibits resistance to high temperatures. Inner support structure 212, hanger 214, strut 208, and other metallic components of the assembly may all be formed of the same material or may be formed of different materials that are able to perform the functions described herein.

The nozzle airfoil 210, including a body of the nozzle airfoil 210, is formed of an advanced, high temperature material, such as a material having a low coefficient of thermal expansion, such as for example, a ceramic matrix composite (CMC) material. Nozzle airfoil 210 extends between inner band 204 and outer band 216.

As will be appreciated, the nozzle airfoil 210 is formed of a material defining a lower coefficient of thermal expansion than a coefficient of thermal expansion of a material forming the inner support structure 212, the hanger 214, the strut 208, and other metallic components. In such a manner, when the gas turbine engine is operated at elevated temperatures, a thermal growth of the inner support structure 212, the hanger 214, the strut 208, and other metallic components relative to the nozzle airfoil 210 may create gaps that allow for an airflow leakage from the working gas flowpath, potentially introducing inefficiencies in the gas turbine engine. Notably, the higher the temperatures to which the components are exposed, the greater the relative growth of the components.

As alluded to earlier, the inventors discovered, unexpectedly during the course of designing gas turbine engines having elevated redline exhaust gas temperatures—i.e., designing gas turbine engines having elevated redline exhaust gas temperatures with various coefficients of thermal expansion mismatch between the turbine stator vanes and respective hangers, various cooling flows provided to the turbine stator vanes, and various stage counts of the turbine stator vanes, and evaluating an overall engine and net propulsive efficiency increases—a significant relationship between the coefficient of thermal expansion mismatch between the turbine stator vanes and respective hangers, the cooling flow provided to the turbine stator vanes, and the stage count of the turbine stator vanes. The relationship can be thought of as an indicator of the ability of a gas turbine having the elevated redline exhaust gas temperatures to be able to achieve the net propulsive efficiency increases, by avoiding the excess cooling flow and flowpath inefficiencies introduced by the relative movement of such components, and taking into account a reliability of such components.

The relationship applies to a gas turbine engine having elevated redline exhaust gas temperatures. The relationship relates the coefficient of thermal expansion mismatch between the turbine stator vanes and respective hangers, a cooling flow provided to the turbine stator vanes, and a stage count of the turbine stator vanes for an engine having a redline exhaust gas temperature at or above 1,100 degrees Celsius, as described in more detail herein.

In particular, the inventors found that increases in a coefficient of thermal expansion mismatch between the turbine stator vanes and respective hangers in an engine having elevated redline exhaust gas temperatures generally results in a corresponding increase in relative thermal expansion between the turbine stator vanes and the respective supporting structure (exacerbated by the elevated redline exhaust gas temperature of the engine), which creates increased opportunity for leakage flow from the working gas flowpath to escape through the joints. Further, with increased relative thermal expansion, there is an increase in a likelihood of the components wearing down prematurely. Moreover, the inventors found that when the gas turbine engine having elevated redline exhaust gas temperatures is operated, an increase in cooling flow may generally be provided to maintain the components within desired operating ranges.

However, the inventors found during the course of designing an engine in accordance with the present disclosure that the thermal expansion mismatch between the turbine stator vanes and respective hangers may be balanced with the amount of cooling provided to the turbine stator vanes at a given stage count of the turbine section. When balanced according to the present disclosure, the above inefficiencies associated with operating at the elevated redline exhaust gas temperature can be overcome, thus providing a net propulsive efficiency benefits. In particular, the inventors found that offsetting a potential inefficiency introduced by higher levels of relative thermal expansion (which may be caused by a combination of the thermal expansion mismatch and elevated operating temperatures) with a tailored reduction in cooling flow may allow for the engine to avoid the described inefficiencies, obtaining the propulsive efficiency benefits that may be achieved with an engine having an elevated redline exhaust gas temperature.

The relationship discovered, infra, can therefore identify a gas turbine engine with an elevated redline exhaust gas temperature capable of achieving a desired net propulsive efficiency benefit, and suited for a particular mission requirement, one that takes into account efficiency, weight, complexity, reliability, and other factors influencing the optimal choice for a gas turbine engine with an elevated redline exhaust gas temperature.

In addition to yielding an improved gas turbine engine, as explained in detail above, utilizing this relationship, the inventors found that the number of suitable or feasible gas turbine engine designs capable of having an elevated redline exhaust gas temperature could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationship providing for the improved gas turbine engine, discovered by the inventors, is a nozzle efficiency factor (NEF), expressed as:

$$NEF = CTER \times \left(1 - \frac{W_N}{W_{25}}\right) \Big/ N^{0.15}.$$

where N is a stage count number of the stage of turbine stator vanes in question, the stage count number being the stage of turbine stator vanes downstream from a combustion section;

where CTER is a coefficient of thermal expansion ratio equal to a coefficient of thermal expansion of a hanger for the turbine stator vanes at stage N divided by a coefficient of thermal expansion of a nozzle of the turbine stator vanes at stage N;

where $W_N$ is a cooling flowrate in kilograms per second of a cooling airflow provided to the turbine stator vanes at stage N; and where $W_{25}$ is a compressor inlet gas flowrate in kilograms per second.

Values for the above relationship within the scope of the present disclosure are provided below in TABLE 1.

TABLE 1

| Parameter | Description | Values |
|---|---|---|
| NEO | nozzle efficiency offset | Greater than 1 and less than 5, such as greater than or equal to 3, such as greater than or equal to 4 |
| CTER | coefficient of thermal expansion ratio | Greater than 1 and less than 6, such as greater than or equal to 3 and less than 5 |
| $W_N/W_{25}$ | cooling flowrate ratio to the turbine stator vanes at stage N during an operating condition of the gas turbine engine | Greater than or equal to 0 and less than or equal to 0.2 |
| N | stage count number | Greater than or equal to 1 and less than or equal to 8, such as greater than or equal to 1 and less than or equal to 5, such as greater than or equal to 1 and less than or equal to 3 |
| $EGT_{Redline}$ | redline exhaust gas temperature | Greater than or equal to 1,100 degrees Celsius and less than or equal to 1,700 degrees Celsius |

Figure 7:
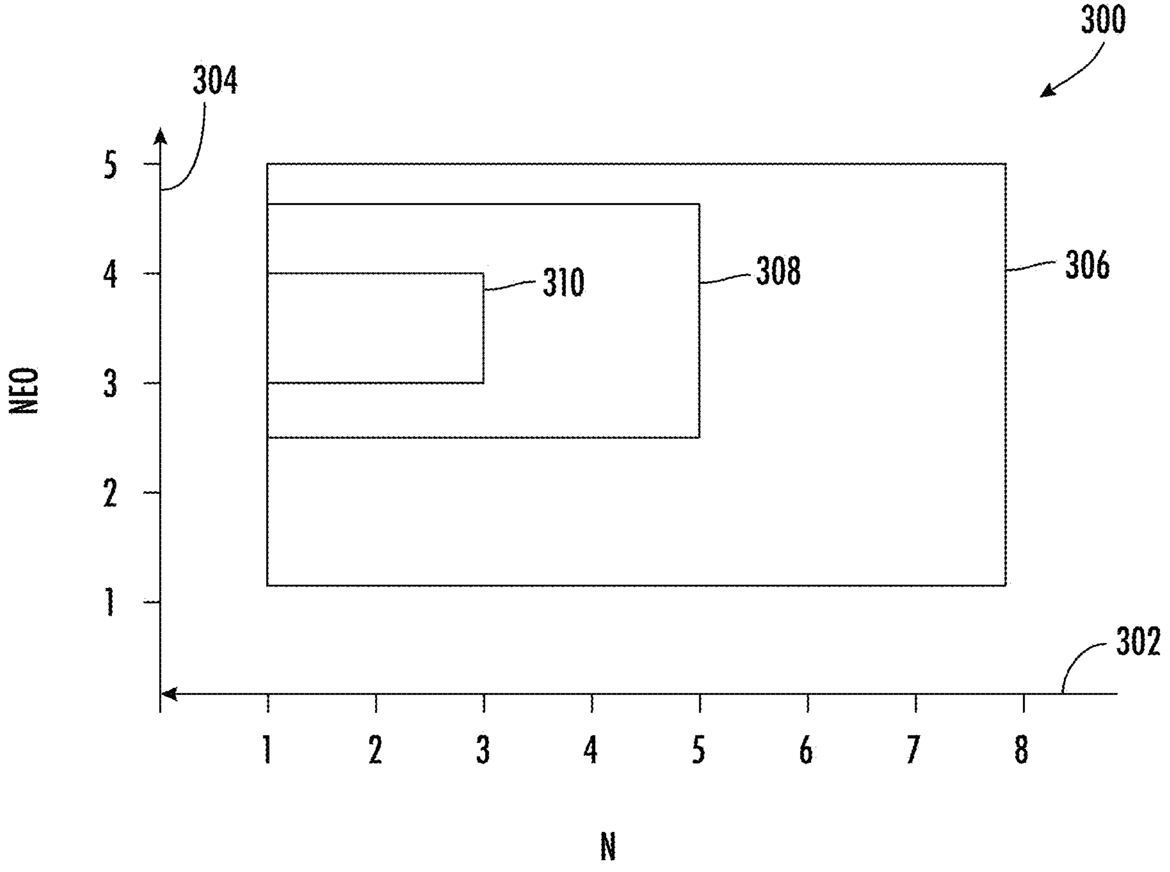
FIG. 7. is a plot of gas turbine engines in accordance with one or more exemplary embodiments of the present disclosure.

Referring now to FIGS. 6 and 7, various exemplary gas turbine engines are illustrated in accordance with one or more exemplary embodiments of the present disclosure. In particular, FIG. 6 provides a table including numerical values corresponding to several gas turbine engines plotted in FIG. 7. FIG. 7 is a plot 300 of gas turbine engines in accordance with one or more exemplary embodiments of the present disclosure, showing the nozzle efficiency factor on a Y-axis 304 and the stage count number, N, on an X-axis 302.

As shown, the plot 300 in FIG. 7 depicts a first range 306, with the NEF values greater than 1 and less than or equal to 5 and N values from 1 to 8. FIG. 7 additionally depicts a second range 308, with the NEF values between 2.5 and 4.5 and N values between 1 and 5; and a third range 310 with the NEF values between 3 and 4 and N values from 1 to 3.

It will be appreciated that with certain exemplary embodiments, each of the turbine stator vanes in stages 1, 2, and 3 may have a NEF value within one or more of the ranges described above. For example, below are sample values for an engine in accordance with an embodiment of the present disclosure having a redline exhaust gas temperature greater than or equal to 1,100 degrees C. and less than 1,700 degrees C., where each of the turbine stator vanes in stages 1, 2, and 3 may have a NEF value within one or more of the ranges described above:

| N | CTER | $W_N/W_{25}$ | NEO |
|---|---|---|---|
| 1 | 4 | .1 | 3.6 |
| 2 | 4 | .015 | 3.55 |
| 3 | 4 | 0 | 3.39 |

Further aspects are provided by the subject matter of the following clauses:

A gas turbine engine comprising: a turbomachine comprising a compressor section, a combustion section, and a turbine section in serial flow order, the turbine section comprising a turbine case and a turbine stage, the turbine stage comprising a plurality of turbine stator vanes, the stage being a stage count number, N, downstream from the combustion section, the turbine stator vanes comprising a first vane assembly comprising a nozzle formed of a first material defining a first coefficient of thermal expansion; and a hanger positioned outward of the nozzle along a radial direction and coupling the nozzle to the turbine case, the hanger formed of a second material defining a second coefficient of thermal expansion, the gas turbine engine defining a coefficient of thermal expansion ratio, CTER, equal to the second coefficient of thermal expansion divided by the first coefficient of thermal expansion, wherein during a high power operation of the gas turbine engine, the compressor section is configured to provide an airflow to the combustion section at a compressor inlet mass flowrate, $W_{25}$, in kilograms per second, and the turbomachine is configured to provide a cooling airflow to the stage of turbine stator vanes at a cooling flowrate, $W_N$, in kilograms per second, and wherein a redline exhaust gas temperature for the gas turbine engine is greater than or equal to 1,100 degrees C. and less than or equal to 1,700 degrees C., wherein the gas turbine engine defines nozzle efficiency factor, NEF, greater than 1 and less than or equal to 5, wherein NEF is expressed as:

$$NEO = CTER \times \left(1 - \frac{W_N}{W_{25}}\right) \Big/ N^{0.15}.$$

The gas turbine engine of any preceding clause, wherein the stage count number is greater than or equal to 1 and less than or equal to 3.

The gas turbine engine of any preceding clause, wherein the turbine section comprises a high pressure turbine and a low pressure turbine, and wherein the stage of turbine stator vanes is a first stage of low pressure turbine stator vanes.

The gas turbine engine of any preceding clause, wherein $W_N$ is 0.

The gas turbine engine of any preceding clause, wherein the NEF is greater than 2.5 and less than or equal to 4.5.

The gas turbine engine of any preceding clause, wherein the NEF is greater than or equal to 3.

The gas turbine engine of any preceding clause, wherein the stage count number is 1 or 2, and wherein $W_N/W_{25}$ is greater than 0 and less than or equal to 0.2.

The gas turbine engine of any preceding clause, wherein $W_N/W_{25}$ is less than or equal to 0.15.

The gas turbine engine of any preceding clause, wherein the CTER is greater than 3.

The gas turbine engine of any preceding clause, wherein the high power operating condition is a takeoff operating condition.

A method of operating a gas turbine engine, the method comprising: operating the gas turbine engine at a high power operating condition, wherein operating the gas turbine engine at the high power operating condition comprises providing an airflow to a combustion section at a compressor inlet mass flowrate, $W_{25}$, in kilograms per second, and providing a cooling airflow to a stage of turbine stator vanes at a cooling flowrate, $W_N$, in kilograms per second, wherein a redline exhaust gas temperature for the gas turbine engine is greater than or equal to 1,100 degrees Celsius (C) and less than or equal to 1,700 degrees C., wherein the stage of turbine stator vanes is a stage count number, N, downstream from a combustion section, the stage of turbine stator vanes comprising a first vane assembly comprising: a nozzle formed of a first material defining a first coefficient of thermal expansion; and a hanger positioned outward of the nozzle along a radial direction and coupling the nozzle to the turbine case, the hanger formed of a second material defining a second coefficient of thermal expansion, the gas turbine engine defining a coefficient of thermal expansion ratio, CTER, equal to the second coefficient of thermal expansion divided by the first coefficient of thermal expansion, wherein the gas turbine engine defines a nozzle efficiency factor, NEF, greater than 1 and less than or equal to 5, wherein NEF is expressed as:

$$NEF = CTER \times \left(1 - \frac{W_N}{W_{25}}\right) \Big/ N^{0.15}.$$

The method of any preceding clause, wherein the stage count number is greater than or equal to 1 and less than or equal to 3.

The method of any preceding clause, wherein the turbine section comprises a high pressure turbine and a low pressure turbine, and wherein the stage of turbine stator vanes is a first stage of low pressure turbine stator vanes.

The method of any preceding clause, wherein $W_N$ is 0.

The gas method of any preceding clause, wherein the NEF is greater than 2.5 and less than or equal to 4.5.

The method of any preceding clause, wherein the NEF is greater than or equal to 3.

The method of any preceding clause, wherein the stage count number is 1 or 2, and wherein $W_N/W_{25}$ is greater than 0 and less than or equal to 0.2.

The method of any preceding clause, wherein $W_N/W_{25}$ is less than or equal to 0.15.

The method of any preceding clause, wherein the CTER is greater than 3.

The method of any preceding clause, wherein the high power operating condition is a takeoff operating condition.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine comprising:

a fan;

a turbomachine rotatably coupled to the fan, the turbomachine comprising a compressor section, a combustion section, and a turbine section in serial flow order, the turbine section comprising a turbine case and a turbine stage, the turbine stage comprising a plurality of turbine stator vanes, the turbine stage being a stage count number, N, downstream from the combustion section, the turbine stator vanes comprising a first vane assembly comprising:

a nozzle formed of a first material defining a first coefficient of thermal expansion; and a hanger positioned outward of the nozzle along a radial direction and coupling the nozzle to the turbine case, the hanger formed of a second material defining a second coefficient of thermal expansion, the gas turbine engine defining a coefficient of thermal expansion ratio, CTER, equal to the second coefficient of thermal expansion divided by the first coefficient of thermal expansion, wherein during a high power operation of the gas turbine engine, the compressor section is configured to provide an airflow to the combustion section at a compressor inlet mass flowrate, $W_{25}$, in kilograms per second, and the turbomachine is configured to provide a cooling airflow to the stage of turbine stator vanes at a cooling flowrate, $W_N$, in kilograms per second, and wherein a redline exhaust gas temperature for the gas turbine engine is greater than or equal to 1,100 degrees Celsius (C) and less than or equal to 1,700 degrees C., wherein the gas turbine engine defines a nozzle efficiency factor, NEF, greater than 1 and less than or equal to 5, wherein NEF is expressed as:

$$NEF = CTER \times \frac{1 - \frac{W_N}{W_{25}}}{N^{0.15}}.$$

2. The gas turbine engine of claim 1, wherein the stage count number is greater than or equal to 1 and less than or equal to 3.

3. The gas turbine engine of claim 1, wherein the turbine section comprises a high pressure turbine and a low pressure turbine, and wherein the stage of turbine stator vanes is a first stage of low pressure turbine stator vanes.

4. The gas turbine engine of claim 3, wherein $W_N$ is 0.

5. The gas turbine engine of claim 1, wherein the NEF is greater than 2.5 and less than or equal to 4.5.

6. The gas turbine engine of claim 1, wherein the NEF is greater than or equal to 3.

7. The gas turbine engine of claim 1, wherein the stage count number is 1 or 2, and wherein $W_N/W_{25}$ is greater than 0 and less than or equal to 0.2.

8. The gas turbine engine of claim 7, wherein $W_N/W_{25}$ is less than or equal to 0.15.

9. The gas turbine engine of claim 1, wherein the CTER is greater than 3.

10. The gas turbine engine of claim 1, wherein the high power operating condition is a takeoff operating condition.

11. A method of operating a gas turbine engine comprising a fan and a turbomachine rotatably coupled to the fan, the turbomachine comprising a compressor section, a combustion section, and a turbine section in serial flow order, the method comprising:

operating the gas turbine engine at a high power operating condition, wherein operating the gas turbine engine at the high power operating condition comprises providing an airflow to the combustion section at a compressor inlet mass flowrate, $W_{25}$, in kilograms per second, and providing a cooling airflow to a stage of turbine stator vanes of the turbine section at a cooling flowrate, $W_N$, in kilograms per second, wherein a redline exhaust gas temperature for the gas turbine engine is greater than or equal to 1,100 degrees Celsius (C) and less than or equal to 1,700 degrees C., wherein the stage of turbine stator vanes is a stage count number, N, downstream from the combustion section, the stage of turbine stator vanes comprising a first vane assembly comprising:

a nozzle formed of a first material defining a first coefficient of thermal expansion; and a hanger positioned outward of the nozzle along a radial direction and coupling the nozzle to the turbine case, the hanger formed of a second material defining a second coefficient of thermal expansion, the gas turbine engine defining a coefficient of thermal expansion ratio, CTER, equal to the second coefficient of thermal expansion divided by the first coefficient of thermal expansion, wherein the gas turbine engine defines a nozzle efficiency factor, NEF, greater than 1 and less than or equal to 5, wherein NEF is expressed as:

$$NEF = CTER \times \frac{1 - \frac{W_N}{W_{25}}}{N^{0.15}}.$$

12. The method of claim 11, wherein the stage count number is greater than or equal to 1 and less than or equal to 3.

13. The method of claim 11, wherein the turbine section comprises a high pressure turbine and a low pressure turbine, and wherein the stage of turbine stator vanes is a first stage of low pressure turbine stator vanes.

14. The method of claim 13, wherein $W_N$ is 0.

15. The gas method of claim 11, wherein the NEF is greater than 2.5 and less than or equal to 4.5.

16. The method of claim 11, wherein the NEF is greater than or equal to 3.

17. The method of claim 11, wherein the stage count number is 1 or 2, and wherein $W_N/W_{25}$ is greater than 0 and less than or equal to 0.2.

18. The method of claim 17, wherein $W_N/W_{25}$ is less than or equal to 0.15.

19. The method of claim 11, wherein the CTER is greater than 3.

20. The method of claim 11, wherein the high power operating condition is a takeoff operating condition.

* * * * *